United States Patent
Joachim et al.

(10) Patent No.: US 11,727,522 B2
(45) Date of Patent: Aug. 15, 2023

(54) METHOD, SYSTEM, AND APPARATUS FOR DAMAGE ASSESSMENT AND CLASSIFICATION

(71) Applicant: Cargo Spectre, Houston, TX (US)

(72) Inventors: Jason Joachim, Houston, TX (US);
Jeremy Joachim, Austin, TX (US);
Shai Bernstein, Medford, MA (US);
Todd Bell, Mill Valley, CA (US);
Michael Glombicki, Bellevue, WA (US)

(73) Assignee: Cargo Spectre, Houston, TX (US)

( * ) Notice: Subject to any disclaimer, the term of this patent is extended or adjusted under 35 U.S.C. 154(b) by 76 days.

(21) Appl. No.: 17/066,785

(22) Filed: Oct. 9, 2020

(65) Prior Publication Data
US 2021/0110200 A1 Apr. 15, 2021

Related U.S. Application Data

(60) Provisional application No. 62/913,864, filed on Oct. 11, 2019.

(51) Int. Cl.
| | | |
|---|---|---|
| *G06Q 50/28* | (2012.01) | |
| *G06Q 10/10* | (2023.01) | |
| *G06V 10/764* | (2022.01) | |
| *G06V 10/778* | (2022.01) | |
| *G06V 20/20* | (2022.01) | |

(Continued)

(52) U.S. Cl.
CPC ......... *G06Q 50/28* (2013.01); *G06F 18/2178* (2023.01); *G06F 18/2413* (2023.01); *G06Q 10/06395* (2013.01); *G06Q 10/10* (2013.01); *G06V 10/764* (2022.01); *G06V 10/7784* (2022.01); *G06V 20/20* (2022.01)

(58) Field of Classification Search
None
See application file for complete search history.

(56) References Cited

U.S. PATENT DOCUMENTS

| | | | | |
|---|---|---|---|---|
| 11,238,506 B1 * | 2/2022 | Tomlinson | ............. | G06N 20/00 |
| 2017/0206643 A1 * | 7/2017 | Weiss | .................... | G06F 3/0485 |

(Continued)

FOREIGN PATENT DOCUMENTS

| | | | | |
|---|---|---|---|---|
| CN | 108122799 A | * | 6/2018 | ........... G01R 31/287 |
| CN | 109961421 A | * | 7/2019 | ............. G01N 21/88 |

(Continued)

*Primary Examiner* — Mohammed Rachedine
(74) *Attorney, Agent, or Firm* — Maier & Maier, PLLC

(57) ABSTRACT

A computer implemented service for identifying and classifying damage. The algorithm may be implemented on a device, such as a computer or mobile device, or on a remote server. The remote server may be a website or cloud-based platform. A user may access the service by sending a request to the remote server including an image, video, or live feed containing an item to be inspected. The service may identify and classify any damage found on the item. The output of the service may include the location of the damaged item, a determination of the presence of damage, a certainty level of this determination, and a heatmap indicating the areas of the image that are most likely to contain damage. The output of the service may be stored on a remote server or may be integrated into existing damage reporting systems.

17 Claims, 3 Drawing Sheets

(51) Int. Cl.
*G06Q 10/0639* (2023.01)
*G06F 18/2413* (2023.01)
*G06F 18/21* (2023.01)

(56) References Cited

U.S. PATENT DOCUMENTS

2019/0228522 A1* 7/2019 Shinoda .................. G06T 7/001
2020/0134800 A1* 4/2020 Hu ......................... G06V 10/25

FOREIGN PATENT DOCUMENTS

| CN | 112567637 A | * | 3/2021 | ............. G01K 3/005 |
| CN | 112740267 A | * | 4/2021 | ........... G06K 9/3233 |
| WO | WO-2019104767 A1 | * | 6/2019 | ........... G06N 3/0454 |
| WO | WO-2020248371 A1 | * | 12/2020 | ........... G06T 7/0008 |

* cited by examiner

METHOD, SYSTEM, AND APPARATUS FOR DAMAGE ASSESSMENT AND CLASSIFICATION

CROSS-REFERENCE TO RELATED APPLICATIONS

This application claims priority to U.S. Provisional Patent Application Ser. No. 62/913,864, filed Oct. 11, 2019 and entitled "DAMAGE ASSESSMENT AND CLASSIFICATION SERVICE", the contents of which are incorporated in their entirety herein.

BACKGROUND

Freight damage claims in the logistics industry can be in the range of trillions of dollars worldwide. Freight is prone to damages at all stages of shipment, yet the damages, and the stage of shipment at which they occurred, may be difficult to detect. Once a shipment has been received at its destination, the responsibility of reporting any damages rests on the receiving facility, and if the receiving party fails to log any damages, they will be liable for any claims on the damaged object. Recording damages can be difficult and time consuming, as damages frequently need to be logged manually, wasting time and resources and increasing expenses. Additionally, when a large volume of freight is shipped, it may be difficult to log damage manually, as each item may not be thoroughly inspected. Furthermore, if many items are damaged, the damage log may become unorganized and tedious to navigate. Moreover, as the freight is not being constantly inspected, it may be difficult to ascertain when and where the damage occurred.

A solution for easily detecting, assessing, and classifying damage is therefore desired.

SUMMARY

A computer program product, system and method for assessing and classifying data may be disclosed. The system may incorporate a remote server, such as a web site or cloud hosted environment. A machine learning algorithm may be implemented in the server and may receive an input to analyze, such as 3D models, sensor data, pictures and videos. The algorithm may then process the input to identify possible damages. When damage is identified, it may be brought to the attention of a user. In an exemplary embodiment, the damage may be circled, and a percentage may be shown indicating the likelihood that the item is in fact damaged, as calculated by the machine learning algorithm. Further, the system may classify the type of damage. Classifications may include, but are not limited to, broken pallets, crushed boxes, and dented barrels.

The server may receive additional input from the user, given in the form of feedback in the event of an error, such as a false positive or missed damages. As users submit errors back to the server, the machine learning algorithm may observe and modify its behavior to account for the errors.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
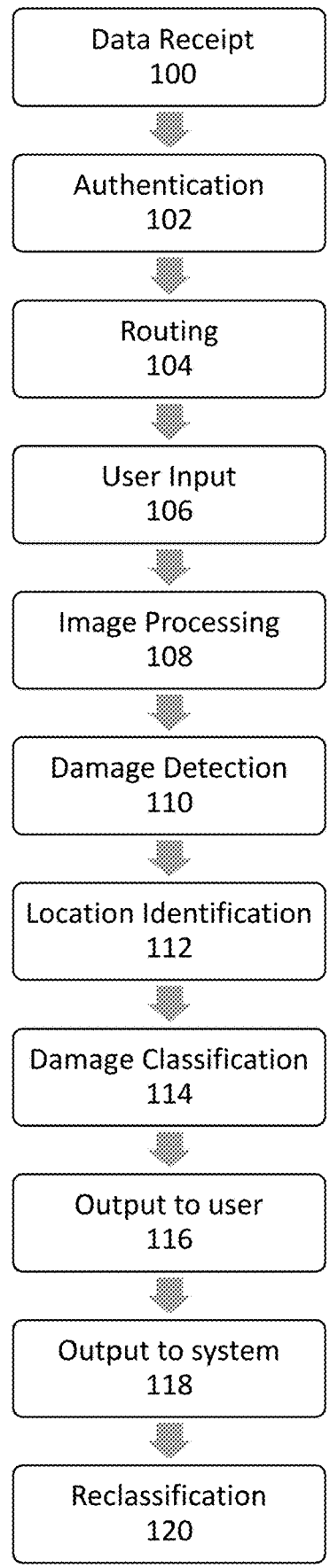
FIG. 1 is an exemplary diagram of a method for implementing a damage detection service.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

A service for identifying and classifying damage may be disclosed. The service may incorporate a machine learning algorithm that resides on a server, such as a website or cloud hosted environment. The server may receive an input. The input may be pictures, videos, sensor data, 3D models, point cloud data, and/or metadata. The input data may be analyzed by the server to determine if any of the input depicts a damaged item. If the algorithm detects damage, it may output a label, identify, or flag designating the damage as such. More than one instance of damage present in the input data may be detected during the analysis. The labeled damage may be emphasized, such as by circling or highlighting the damaged portion, and each instance of damage may be emphasized separately from other instances of damage. A percentage may be displayed which may represent the likelihood that the input actually depicts a damaged item, as calculated by the machine learning algorithm. Additionally, the damage may be classified to identify the type of damage. For example, the damage may be labeled as "broken pallet", "crushed boxes", or "dented barrels". These are merely exemplary labels and any possible label may be attributed to an image to describe a type of damage.

The output of the algorithm may be implemented such that a user is notified or presented with the determination when damage is detected. The output may be available to a user through multiple data integration avenues. The determination may be stored to a log, presented to a mobile device as an email or a notification, or may be otherwise alerted. The notification may provide the user with information such as an identification of the damaged item, the location of the damaged item, and the type of damage.

Further, it may be contemplated that the user may configure the system to provide notifications for items that are labeled as damaged above a certain accuracy. For example, a user transporting a high volume of freight may wish to only be notified if there is greater than an 80% chance that the machine learning algorithm has properly detected damage, whereas a user transporting at a lower volume may wish to be notified if the chance of damage is greater than 40%.

The algorithm may initially be trained by creating a dataset of images which have already been labeled as damaged or undamaged. While training, the algorithm may create templates, weights, biases, and correspondences in the dataset that explain the given label. The algorithm may also use this data to explain its prediction, such as in the form of a heatmap. A large amount of data may increase the accuracy of the templates, weights, and biases. It may be contemplated the training dataset may be perturbed in such a way that creates slight variations of the dataset, in order to increase the size of the dataset and provide for additional training of the algorithm.

In the event of a misidentification of an item, the system may adjust by receiving input from a user. The input may be in the form of an image or a video that was incorrectly classified by the machine learning algorithm. For example, a user may input an image which the algorithm incorrectly classified as a damaged item, along with a label indicating that the item is not damaged. Alternatively, the user may input an image which the algorithm incorrectly classified as not damaged, along with a label indicating that the item is damaged. The algorithm may receive these user inputs and may recalibrate in order to better account for these errors or exceptions in the future. The recalibration may occur autonomously and may only be prompted by the user input. Thus, the algorithm may continuously increase its accuracy and effectiveness.

The output of the algorithm may be stored on a server, such as a cloud-based environment or a web site which may allow user access. Alternatively, the output of the algorithm may be sent to a user's personal system. For example, an existing freight shipping operation may have systems in place where an employee can manually flag damaged freight. In this example, the machine learning algorithm described herein may interface with the existing freight system to automatically and autonomously flag damaged freight. As a result, the integration of the present invention may not require extensive changes to existing systems, thus reducing expenses and increasing efficiency.

In another exemplary embodiment, the algorithm may be implemented on a web page. Users may visit the web page and upload an input, such as an image, using a computer or mobile device. The input may then be processed by the web site, and the web site may return a report identifying any damages. The damages may be identified as data and as a picture. The picture may identify the damage and the location of the damage by pointing it out or circling it.

Additionally, the algorithm may be implemented on a downloadable application. The mobile application may allow a user to upload an input, similar to the previously described web page. The application may then process the input and return a report to the user. The processing may occur entirely on the mobile device, such that internet connectivity may not be required. An offline application may be desired in locations where internet connectivity is not available. Further, a user may prefer an offline application for security purposes. Alternatively, the application may upload the image to a remote server which may process the image and then may return the output of the processed image to the application. This alternative exemplary embodiment may utilize internet connectivity, however may also consume less power than the offline alternative.

In an alternate exemplary embodiment of the downloadable application, the application may receive a constant video feed as input and may continuously analyze the video feed to identify possibly damaged items. In an exemplary embodiment, a mobile device may be mounted in a location from which the device's camera may view multiple freight items. It may be contemplated that a mobile device as used herein may refer to a smartphone or a tablet with a camera. Alternatively, a mobile device may be a mobile camera which may be capable of relaying images, videos, or a live feed to a separate external device which may process and analyze the input. The output may then be transmitted to log, such as on a server or a warehouse management system. Additionally, it may be contemplated that the embodiments implemented on the mobile device may also be implemented on a stationary or fixed device, such as a fixed security camera.

When a damaged item is identified, the application may identify the mobile device's GPS location and in order to calculate or estimate the location of the damaged item, which may be sent with a report to the user. Alternatively, the application may be configured to store the mobile device's location based on user input or other factors. A user may carry the mobile device to various locations, allowing it to scan a variety of freight items in order to identify which items may be damaged. In this exemplary embodiment, it may be contemplated that the user may have the mobile device fixedly mounted to their body, such that they may perform other tasks while the device continuously scans the environment for damaged items. It may be contemplated that a user other than the person carrying the mobile device may be notified of the damage. The notification may be sent to another mobile device, application, or system. The application may be configured to integrate the damaged item data with an existing data logging system, separate from the mobile device.

In a further embodiment, a camera or a mobile device may be mounted to a vehicle, such as a forklift, or a tool frequently used for moving freight. The camera may be mobile relative to the freight location and may view a larger number of items. Additionally, items that are damaged on the forklift may be readily identified as the damage occurs. The algorithm may identify an item that was previously undamaged and has recently become classified as damaged. As a result, the time, location, and cause of the damage may be identified. In a further embodiment, the service may identify an accident as it happens, and may record a video or image of the accident.

Additionally, the algorithm may be implemented on a virtual or augmented reality device, such as HoloLens or Google Glasses. The device may provide a constant video feed of wherever the user is looking, and a heads-up display may provide information relating to freight currently in the line of sight of the viewer. The freight may be identified and analyzed for damage. If damage is detected, a report or notification may be sent to another user, saved to a log, or integrated with an existing system.

In another exemplary embodiment, the algorithm may interface with existing in-house systems. For example, the system may interface with existing warehouse management systems (WMS) or enterprise resource planning (ERP) software. The user may utilize the machine learning algorithm via an API connection such that the algorithm can easily be integrated into the current system. When a picture is uploaded to the current system, the algorithm may process it and identify possible damage. The damages may be flagged, and pictures and data may be appropriately logged with the existing in-house system or software. Additional training may not be required, and installation costs may be low since the existing system may still be utilized.

The algorithm may also be implemented on an existing dimensioning system. The dimensioning system may be a station which may weight or identify dimensions of the freight. In the process, it may take pictures and submit those pictures to the machine learning algorithm for processing. Since all or most of the freight may pass through such a system, it may be possible to scan a large amount of freight. Further, the dimensioning system may be implemented such that freight passes through it upon arrival at the facility, so the algorithm may scan items that are received from another facility damaged and identify them as such. The dimensioning system may already implement cameras which are used for identifying dimensions of the freight. The feed or images from these cameras may be processed by the algorithm. Alternatively, additional cameras may be implemented or fitted to the dimensioning system which are specifically for identifying damage using the algorithm.

Although the previous embodiments describe the algorithm as applied to freight, the algorithm, method, and system may be implemented in any field, location, or industry where defects or damages need to be detected. Further, the input may be any of a variety of types, such as sensor data, 3D data or models, metadata, or any other contemplated input. For example, the algorithm may be implemented in the petroleum industry where it may be trained to detect damages in pipes and valves. In this exemplary embodiment, the algorithm may identify pipes that are failing or likely to fail due to some sort of damage. Alternatively, a similar algorithm may be applied in the field of medicine, to identify damages to a human body by analyzing visible symptoms, x-rays, MRIs, heart rate, or other physiological data.

In another exemplary embodiment, the system may be implemented in the construction industry. Construction sites may use large amounts of building materials, and the algorithm may be able to quickly and autonomously identify defects in building materials. Similarly, a manufacturer of any product, such as construction building materials, automotive parts, or any other contemplated item or product may implement the system at the end of the manufacturing of the item such that it may identify items that are incorrectly manufactured. Purchasers of large amounts of manufactured parts, such as automotive companies, may implement such an algorithm upon receiving the parts to ensure they are free from defects. The algorithm may alternatively be implemented at the end of an assembly line to ensure that the item is properly assembled without defects.

The machine learning algorithm may be implemented as a web service. The web service may allow users to use the capabilities of the machine learning network from any internet-connected device, such as a smartphone, tablet, or personal computer. Users of the damage detection web service may access it by making a web request from their device. The web service may accept the request and rout it according to specified parameters. The web service may then perform an authentication check to verify the user. The user may be verified to ensure that the user is authorized to use the system and can be billed based on usage of the service. The web request may be stored on a server in order to accurately bill the user based on usage and to enable the algorithm to improve itself in the case where the request is handled incorrectly (i.e. the input image is incorrectly classified or labeled).

After routing and authenticating the user, the service may then pass the request to the machine learning network. The network may classify the request, such as based on the presence or absence of damage in the provided image. The machine learning network may provide outputs such as a determination of the presence of damage, a certainty level of this determination, and a heatmap indicating the areas of the image that most likely contain damage. Outputs may be collected together in a standard data format and may be returned to the user as a web response.

The web service may implement additional features to facilitate damage detection. One such feature may be an error-reporting module. The error-reporting module may allow users to inform the service of any misclassifications or errors. When the service receives an error report, it may locate the associated request which was previously stored and may reclassify it as directed from the error report. The algorithm may analyze the factors leading to the misclassification in order to reconfigure and avoid the same mistake in the future.

In an exemplary embodiment, an administrator may have control of the service. The administrator may allow or deny access to different users, collect usage information for billing purposes, and examine previous scans and error-reports. The administrator may make changes to the web service without redeploying or otherwise causing a service interruption.

Referring now to exemplary FIG. 1, a method for classifying damage may be shown. The method may begin by receiving user data 100. The user data may include the user credentials, for authentication, a requested service, and a set of input data which the user seeks to submit or analyze. The method may continue by authenticating a user 102. The authenticated user may then be routed to the correct service 104. Since the web service may implement multiple services, such as one for automobile manufacturers and another for construction materials, it is important that the user is routed to the correct service. In a next exemplary step, the user input data may be analyzed by the algorithm 106. The input may be in the form of an image, video, or live feed. This step may be done autonomously by a computer program which continuously feeds input to the service. In a next step, the user input is processed 108. The processing may occur on a local machine or on a remotely located server.

The processing may lead to the detection of damage 110. In some embodiments, multiple instances of damage may be detected in a single user input as a result of the processing and detection steps. In a further optional step, the location of the damaged item may be identified 112 when damage is detected. Additionally, the damage may be classified 114. Classifications may include labels such as "broken pallet", or "dented barrels". The classification may then be presented to the user as output of the service 116. The output may include the determination of damage, the type of damage, the certainty that the item is damaged as calculated by the algorithm, the location of the damaged item, and a heatmap showing which parts of the image likely show damage. In a next exemplary step, the output of the service may also be stored to an external system 118. For example, a warehouse may implement a warehouse management system (WMS) or enterprise resource planning (ERP) software. The WMS or ERP systems and software may contain a module which allows for a user to manually log damaged items. The service described here may instead automatically log damaged items into the existing WMS or ERP system or software.

In a final optional exemplary step, the user may reclassify an image which the method incorrectly classified 120. The user reclassification is received and analyzed by the service, which may then automatically recalibrate in order to account for the error and prevent similar errors in the future. It may be contemplated that the above steps may take place in any order. The order shown in FIG. 1 is merely for illustrative purposes. For example, the steps of detecting damage 110, locating the damage on an image 112, and classifying the damage 114 may occur simultaneously. In another exemplary embodiment, the routing 104 may take place before the authentication of the user 102.

Figure 2:
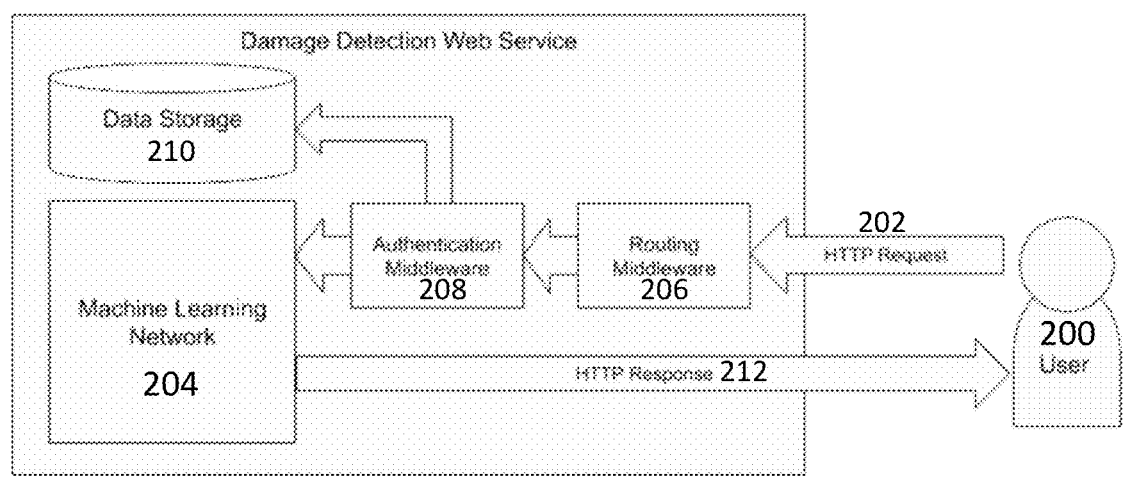
FIG. 2 is an exemplary illustration of a damage detection web service.

Referring now to the exemplary embodiment in FIG. 2, a damage detection web service may be illustrated. A user 200 may attempt to access the machine learning network 204. The user 200 may send a HTTP request 202 to the service. The HTTP request 202 may include information regarding the type of request, the user's credentials, and an input image to be processed by the service. The HTTP request 202 is first analyzed by routing middleware 206 in order to route the user to the correct service, based on the type of request included in the HTTP request 202. The service may also send the request 202 to be analyzed by authentication middleware 208, which may analyze the user's credentials to verify that the user has authorization to access the service. Next, the HTTP request 202 may be analyzed by the machine learning network. Optionally, the request 202 may be stored in a data storage module 210, in order to create a log of requests and to identify which requests were incorrectly classified. The machine learning algorithm 204 may analyze the request 202 based on the input image and the type of request. The machine learning algorithm 204 may then output data as an HTTP response 212 to be presented to the user 200. It may be contemplated that the functions in between the user sending the request and the machine learning network sending a response may take place in any contemplated order. Some functions may be completed simultaneously with or independently of other functions. The response 212 may include information such as the determination of damage in the input image, the location of the damage on the image (such as in the form of a heatmap), the type of damage, the certainty that damage is correctly identified, and location of the damaged item. An exemplary embodiment of output data may be shown in FIG. 3.

Figure 3:
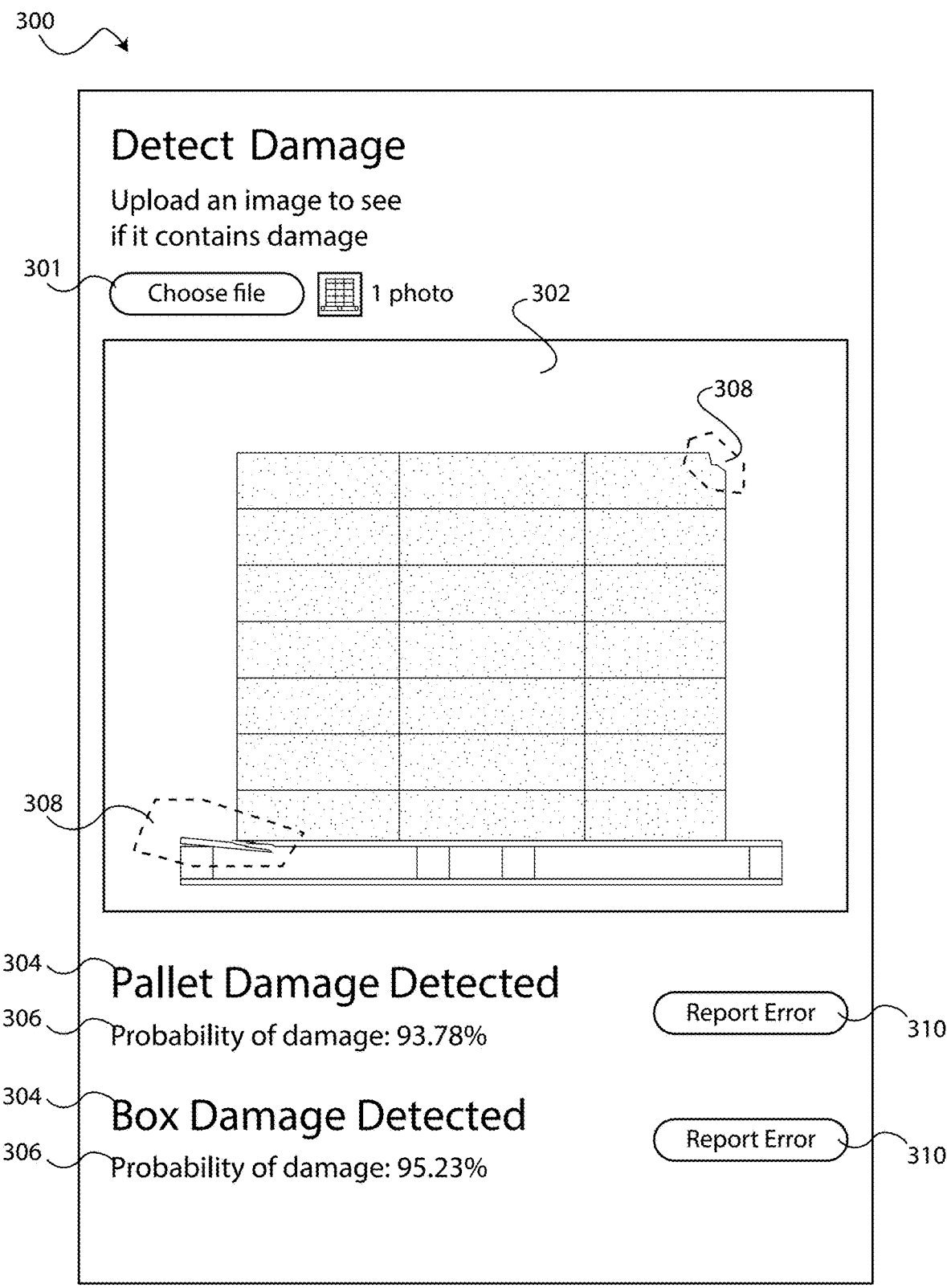
FIG. 3 is an exemplary embodiment of an interface and output of a damage detection web service.

Referring now to the exemplary embodiment illustrated in FIG. 3, the interface and output of a damage identification and classification service may be shown. The interface 300 may include a "choose file" button 301 which may prompt the user to insert an image 302 to be analyzed. The image 302 may then be displayed in the interface 300. Once the analysis is complete, the interface may display the resulted classification or determination of damage. In this exemplary case, pallet damage was detected, as indicated in the determination output 304. Additionally, the probability of damage 306 may be displayed alongside the determination output 304. The input image 302 may be returned with a shape 308 enclosing the likely damaged portion of the image. The shape 308 may indicate which part of the item is damaged. After classification is complete, the user may have the option of reporting an error, which may be initiated with the report error button 310. The user may use the error reporting function to correct a mistake made by the algorithm, and the algorithm may consider the error and recalibrate in order to compensate for the error in the future.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method for damage assessment and classification, comprising:
    receiving visual data regarding at least one object to be analyzed;
    analyzing the received visual data so as to detect damage on the at least one object;
    determining a type and a location of the detected damage on the at least one object;
    classifying the detected damage according to the determined type of damage;
    outputting damage information regarding the detected damage and the determined type of damage with a shape showing the determined location of the detected damage on the at least one object, wherein the analyzing, determining, and classifying steps are performed by a machine learning algorithm.

2. The method of claim 1, further comprising:
    determining, by the machine learning algorithm, a location of the detected damage on the at least one object; and
    outputting damage location information regarding the location of the detected damage.

3. The method of claim 2, wherein the damage location information is output as a heatmap overlaid on a representation of the at least one object.

4. The method of claim 1, further comprising:
    determining, by the machine learning algorithm, a certainty of the detected damage on the at least one object; and
    outputting confidence information regarding the certainty of the detected damage.

5. The method of claim 1, wherein the received visual data is one or more of an image, a video, a 3D image, and a live video feed.

6. The method of claim 1, further comprising:
    receiving error information when the detected damage on the at least one object is incorrectly detected; and
    recalibrating the machine learning algorithm.

7. A non-transitory computer-readable medium for damage assessment and classification, comprising instructions stored thereon, that when executed on a processor, perform the steps of:

receiving visual data regarding at least one object to be analyzed;

analyzing the received visual data so as to detect damage on the at least one object;

determining a type and a location of the damage detected on the at least one object;

classifying the detected damage according to the determined type of damage;

outputting damage information regarding the detected damage and the determined type of damage with a shape showing the determined location of the detected damage on the at least one object, wherein the analyzing, determining, and classifying steps are performed by a machine learning algorithm.

8. The non-transitory computer-readable medium of claim 7, wherein damage location information is output as a heatmap overlaid on a representation of the at least one object.

9. The non-transitory computer-readable medium of claim 7, further comprising:

determining, by the machine learning algorithm, a certainty of the detected damage on the at least one object; and outputting confidence information regarding the certainty of the detected damage.

10. The non-transitory computer-readable medium of claim 7, further comprising:

determining a location of the at least one object having the damage detected thereon; and outputting object location information regarding the location of the at least one object.

11. The non-transitory computer-readable medium of claim 7, wherein the received visual data is one or more of an image, a video, a 3D image, and a live video feed.

12. The non-transitory computer-readable medium of claim 7, further comprising:

receiving error information when the detected damage on the at least one object is incorrectly detected; and recalibrating the machine learning algorithm.

13. A computer-implemented system for damage assessment and classification, comprising:

a communications device configured to receive visual data regarding at least one object to be analyzed and send output data;

a processor configured to execute a machine learning algorithm to perform the steps of:

analyzing the received visual data so as to detect damage on the at least one object;

determining a type and a location of the detected damage on the at least one object; and classifying the detected damage according to the determined type of damage;

wherein the output data comprises damage information regarding the detected damage and the determined type of damage and a shape is displayed showing the determined location of the detected damage on the at least one object.

14. The computer-implemented system of claim 13, wherein damage location information is output as a heatmap overlaid on a representation of the at least one object.

15. The computer-implemented system of claim 13, wherein the machine learning algorithm further performs a step of determining a certainty of the detected damage on the at least one object; and the output data further comprises confidence information regarding the certainty of the detected damage.

16. The computer-implemented system of claim 13, wherein the received visual data is one or more of an image, a video, a 3D image, and a live video feed.

17. The computer-implemented system of claim 13, wherein the communications device is further configured to receive error information when the detected damage on the at least one object is incorrectly detected; and the machine learning algorithm further performs a step of recalibrating the machine learning algorithm.

* * * * *